US006644211B2

(12) United States Patent
Baier et al.

(10) Patent No.: US 6,644,211 B2
(45) Date of Patent: Nov. 11, 2003

(54) DEVIATING DEVICE FOR TRANSPORTING MEANS (75) Inventors: Wolfram Baier, Ostfilder (DE); Guido Hettwer, Stuttgart (DE); Johannes Koban, Stuttgart (DE); Olaf Klemd, Marktgroeningen (DE); Paul Skljarow, Schwieberdingen (DE); Peter Ludwig, Tuebingen (DE); Uwe Lindemann, Holzgerlingen (DE); Joachim Fischer, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/122,891

(22) Filed: Apr. 15, 2002

(65) Prior Publication Data
US 2002/0174795 A1 Nov. 28, 2002

(30) Foreign Application Priority Data
Apr. 14, 2001 (DE) .......................... 101 18 567
Jun. 19, 2001 (DE) .......................... 101 29 236

(51) Int. Cl.⁷ ................................................ B61B 3/00
(52) U.S. Cl. ...................................... 104/172.4; 104/89
(58) Field of Search ............................. 104/130.07, 89, 104/173.1, 91, 93, 172.4, 172.5; 198/831, 839, 842, 845

(56) References Cited

U.S. PATENT DOCUMENTS

| 936,917 A | * | 10/1909 | Levalley | 104/172.4 |
| 1,876,373 A | * | 9/1932 | Whitney | 104/91 |
| 1,903,488 A | * | 4/1933 | Stibbs | 104/172.4 |
| 2,546,374 A | * | 3/1951 | Rayburn et al. | 104/172.4 |
| 3,202,259 A | * | 8/1965 | Orwin | 104/93 |
| 3,308,768 A | * | 3/1967 | Orwin | 104/172.4 |
| 3,424,104 A | * | 1/1969 | Allen | 104/172.4 |
| 3,577,930 A | * | 5/1971 | Rooklyn | 104/173.1 |
| 3,807,314 A | * | 4/1974 | Slemmons | 104/172.4 |
| 3,993,204 A | * | 11/1976 | Hummel | 104/89 |
| 4,461,216 A | * | 7/1984 | Carney | 104/172.4 |
| 4,850,281 A | * | 7/1989 | Kurek | 104/172.4 |
| 4,875,573 A | | 10/1989 | Wiseman | 198/831 |
| 5,875,573 A | | 3/1999 | Hayden | 37/91 |

FOREIGN PATENT DOCUMENTS

DE 32 13 986 A1 11/1982

OTHER PUBLICATIONS

Chain Conveyor System, Bosch Automation, Version 1.0, PP 1–0–4–4.

* cited by examiner

Primary Examiner—S. Joseph Morano
Assistant Examiner—Lars Olson
(74) Attorney, Agent, or Firm—Michael J. Striker (57) ABSTRACT A deviating device for deviating a transporting means in a deviating plane was a deviating unit, two track portions of a movement path of a transporting means adjoining the deviating device and clamping the deviating plane, and mountable on the deviating unit, the track portions being mountable on a separate component of the deviating device, the components being turnable relative to one another about a turning axis which is substantially orthogonal to the deviating plane and being fixable in a predetermined angular position.

13 Claims, 10 Drawing Sheets

DEVIATING DEVICE FOR TRANSPORTING MEANS

BACKGROUND OF THE INVENTION

The present invention relates to a deviating device (subsequently referred to as a "deviating station" for "deviating unit" or deviating a transporting means in a deviating plane, wherein two track portions of a movement path of the transporting means which adjoin the deviating device and clamp the deviating plane are mounted on the deviating unit. The transporting means can be in particular flexible transporting means, for example chains, synthetic plastic belts, etc.

Transporting devices are known in various embodiments. For example German patent document DE 32 13 986 C2 discloses an endless transporter which has a plurality of carrier parts which are connected by means of an endless transporting chain. With the transporting chain which is movable at all sides it is possible to guide the endless transporter flexibly in a corresponding space. In order to perform a direction change of the endless transporter, deviating stations are utilized which deviate the chain in a predetermined angle. For this purpose in the prior art deviating stations are known, with which the chain is deviated over a fixed angle of 30°, 45°, 90° or 180°. By combination of several deviating stations, the chain can be deviated over different angles. Here however for example for deviation of 60° the use of two deviating stations with an angle of 30° is needed, whereby the cost for the transporter is increased, since for one deviation several deviating stations with fixed, predetermined angles are needed. Furthermore, with the deviating stations having predetermined angles no complete flexibility during the guidance of a chain or transporter can be provided, since the transporting chain is not deviatable by any angle.

Such transporting units are disclosed in the catalogue "Chain Transporting System Vario Flow", Edition 1.0 Robert Bosch, GmbH Stuttgart DE, pages 1-0 as well as 4-0 to 4-3. Two tangential adjoining track portions are mounted on the deviation unit. The angle which the both track portions enclose can be provided with several values. For this purpose the deviating unit is composed of an upper part and a lower part which are turnably supported on one another. Since the upper and the lower parts are placed over one another, cooperating of corresponding bearing points must be provided, whereby two different cast molds are needed. Further, the both parts are relatively large.

SUMMARY OF THE INVENTION

Accordingly, it is an object of the present invention to provide a deviating device of the above mentioned general type which makes possible deviation the transporting means over any angle.

In keeping with these objects and with others which will become apparent hereinafter, one feature of the present invention resides, in a deviating device of the above mentioned general type, in which the both track portions are mounted each on a separate component of the deviating device, wherein the both portions are turnable relative to one another about a turning axis which is substantially orthogonal to a deviating plane and are fixable correspondingly in a predetermined angular position.

The inventive deviating device has the advantage that it can deviate the transporting means at any angle, whereby when compared with the prior art, the number of parts and components, which are needed for maintaining a deviating devices with different deviating angles can be reduced. Furthermore, manufacturing or tool costs are reduced, since the inventive deviating device can be used at any deviating points in the transporting path. In addition to this, the inventive deviating device is favorable to manufacture and easy to mount.

In accordance with a first embodiment of the present invention, the both components can be formed so that they are mounted on one another. This leads to a further reduction of the parts which are required for maintaining of the inventive deviating device. It is also advantageous for manufacturing and storage costs, when the both parts are formed identical, for example as cast parts.

In order to facilitate the positioning of the both components relative to one another, a centering ring can be provided, which in the operation-ready condition of the deviating device it is arranged so as to surround the turning axis between the both components. It is however also possible that one of the both components has a ring-shaped flange which serves for positioning of the other components.

A connecting pin which extends coaxially to the turning axis, for example a screw pin can be inserted through each of the openings of each component. When each of the components has a plurality of such openings, these components can be used for making available deviating devices with different deviating radii, which is also advantageous for manufacturing and bearing costs.

Depending on whether the supporting surfaces of both components are formed so as to provide form-locking for example by means of an end toothing or frictional engagement, the deviating angle can be varied in predetermined angular steps or in a stepless fashion.

Alternatively, each of the both components can have a plurality of openings, which are arranged at equal distances from one another, and preferably over a peripheral circle around the running axis. This embodiment also allows deviation of the deviating angle in a predetermined angular roster? When to the contrary one of the both components has at least one elongated hole, at least one opening and/or an elongated hole of the respective other component located opposite to it, the deviating angle can be varied in stepless manner. In this case, the direction of extension of the elongated holes follows a peripheral circle around the turning axis. An especially wide variation region with different angles can be provided when the both components have each two elongated holes located geometrically opposite relative to the turning axis.

In accordance with a second embodiment, the both components can be mountable on a common base plate. This embodiment has a special advantage with respect to the mounting of the deviating device, since the base plate can be assembled with the further functional points of the deviation device, before subsequently the both parts with or without the adjoining track portions can be mounted on the base plate in the desired angular position.

When the base plate has two elongated holes, preferably located diametrically opposite to one another with respect to the turning axis, its longitudinal extension preferably follows a peripheral circle around the turning axis. Thereby the deviating angle can be varied in a stepless fashion.

As indicated before, in all embodiments the both components preferably are fixed by means of at least one connecting pin, preferably by means of at least one screw pin, in the predetermined angular position.

For connection of the both parts with the track portions associated with them, in accordance with a first alternative a connecting element is formed of one piece with each of the both components, and is mountable on one of the track portions. In accordance with a second alternative, it is however possible that at least one separate connecting element is provided, which on the one hand is mountable on one component and on the other hand is mountable on a track portion. In both alternatives the connecting element can be mounted in a simple and reliable manner on the track portion, when the connecting element is mountable in a receiving groove of the track portion and is mountable in it on the track portion.

For reducing the sliding friction during deviation of the transporting means, it is proposed that the deviation device includes a deviating wheel for the transporting means, wherein the deviating wheel is supported rotatably about the turning axis by means of a bearing on a receptacle which surrounds one of the both components. A drive unit can engage directly or indirectly the deviating wheel. It operates for displacing the deviating wheel in a rotary movement around the turning axis. Thereby the inventive deviating device additionally can perform the function of a drive device for the transporting means. For this purpose it is further proposed to arrange a coupling between the drive unit and the deviating wheel.

When the deviating wheel is formed plate-shaped and connected with the rotary bearing through a connecting element, it makes possible a simple mounting of the deviating wheel, since the connecting element can be pre-mounted with the bearing. Basically, it is also recommended to provide a round deviating wheel flange which is formed of one piece with it, through which the deviating wheel is connected with the rotary bearing.

Finally, the inventive deviating device can include two deviating wheels, which deviate the transporting means in an upper run in the transporting plane and in a lower run parallel to the transporting plane.

It is to be understood that the inventive deviating station for a continuous conveyor has the advantage that it can deviate the pulling means over any angle. Thus the inventive deviating station makes possible a completely flexible angle adjustment for deviating the pulling means. Thereby in particular the number of the parts and component groups can be reduced, which in the prior art were needed for the deviating stations with different deviating angles. Furthermore, in particular the manufacturing and tool costs are reduced, since the inventive deviating station can be used at all deviating locations in the transporting path. For this purpose in accordance with the present invention a receptacle, on which the bearing for the deviating wheel is arranged, can be composed of several parts. For example the receptacle can be composed of an upper part and a lower part, which are releasably connected with one another. In the release of condition the components are turnable relative to one another, so that any deviating angle of the pulling means can be adjusted by turning of the both components relative to one another. Thereby in accordance with the present invention, any angular position at the deviating station is possible, while the deviating station can be used both for horizontal deviations and also for vertical deviations, preferably the upper component and the lower part of the receptacle can be connected with one another by screws. Thereby it can be guaranteed that the both components are released for an adjustment of their position relative to one another and subsequently can be fixed again with one another.

For providing a definite positioning of the upper and lower components of the receptacle relative to one another and a simple turning of the both components relative to one another, either the upper component or the lower component has a ring shaped flange. On this flange the other component can be simply turned.

Preferably, the upper and the lower components each have a plurality of openings, which are spaced from one another at equal distances. Thereby an adjustment of the angle in a pattern can be provided, wherein the corresponding difference between the neighboring angles depends on the distance between the openings relative to one another. For example, the opening distances can be selected so that the adjustment steps of the subdivided receptacle can be provided in the region of 1°, 2° or 5°.

In order to provide a completely flexible adjustment of the angle at the deviating station, the upper and the lower component of the receptacle can have two diametrically oppositely located elongated holes. The both components are connectable by screws extending through the elongated holes. Thereby the angle of the deviation can be adjusted to any angular value.

Preferably, the path profile of the continuous conveyor can be mounted directly on the deviating station. Here preferably one path profile leading to the deviating station can be arranged either on the upper or the lower component and one path profile leading away from the deviating station can be arranged on the other component. In other words, when for example the path profile leading to the deviating station is connected with the upper component of the receptacle, the path profile which leads away from the deviating station is connected with the lower component of the receptacle.

In accordance with a preferable embodiment of the invention, a drive unit is mounted on the deviating station to drive the deviating wheel. Thereby the inventive deviating station can be used not only for deviation of a transporting chain, but also simultaneously for its drive. The drive unit can be formed for example as a flanged gear motor. Thereby a separate drive unit for the continuous conveyor can be dispensed with.

Preferably in accordance with the present invention a coupling is arranged between the drive unit and the deviating wheel.

For providing a simple connection of the deviating wheel with the bearing, the deviating wheel is formed plate-shaped and on its outer periphery has a plurality of teeth for engagement with a chain used as a pulling means. The plate-shaped deviating wheel can be connected with the bearing through a connecting element. Thereby, the plate-shaped deviating wheel and the connecting element can be composed of different materials.

In accordance with a further embodiment of the present invention, a flange is formed of one piece on the deviating wheel, for connecting the deviating wheel with the bearing. Thereby the number of parts at the deviating station can be reduced.

It is especially advantageous when the inventive continuous conveyor is formed as a chain conveyor, which uses a chain as a pulling means. Furthermore, the inventive deviating unit has the advantage that it is favorable to manufacture and easy to mount, since the deviating unit has a plate on which at least one wing is turnably arranged, on which the track portion is mountable.

It is especially advantageous when a wing is mounted on the plate through at least two pin-shaped elements.

It is also advantageous when a connector is mounted on the wing and is anchored in a longitudinal groove of the track portion. Preferably, the device is formed substantially mirror-symmetrically and has two wings. When the wings are guided in two diametrically opposite elongated holes of the plate, the angle enclosed by the track portions can be adjusted in a stepless manner.

The deviating unit can have at least one deviating wheel for the transporting means which is supported in the plate. Therefore, the transporting means can be deviated without a sliding friction.

In accordance with a preferable embodiment of the invention, the deviating unit has a drive for the deviating wheel, which is flanged on the plate.

In accordance with a further advantageous embodiment of the present invention, two deviating wheels are arranged on the deviating unit. They deviate the transporting means in an upper run in the transporting plate and in a lower run parallel to the transporting plane.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIGS. 1–5 are views showing a first alternative embodiment of a deviating device in accordance with a present invention, wherein

FIG. 6 is a view showing a second alternative embodiment of an inventive deviating device, wherein FIGS. 7–10 are views showing a third alternative embodiment, wherein

DESCRIPTION OF THE PREFERRED EMBODIMENTS

A deviating station in accordance with the first embodiment of the present invention is shown in FIGS. 1–5.

Figure 1:
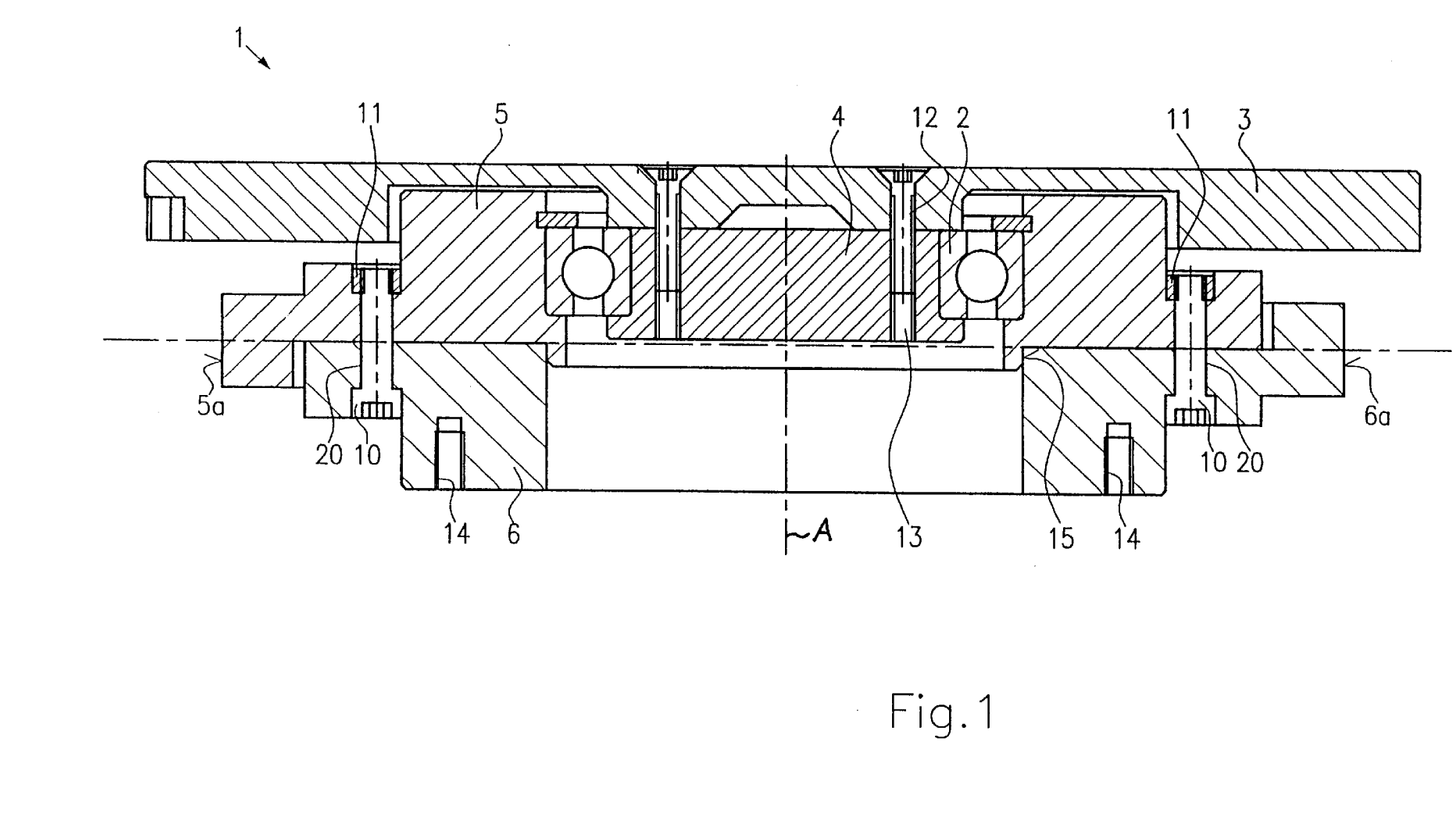
FIG. 1 is a schematic section of a deviating station in accordance with a first embodiment of the present invention.
Figure 2:
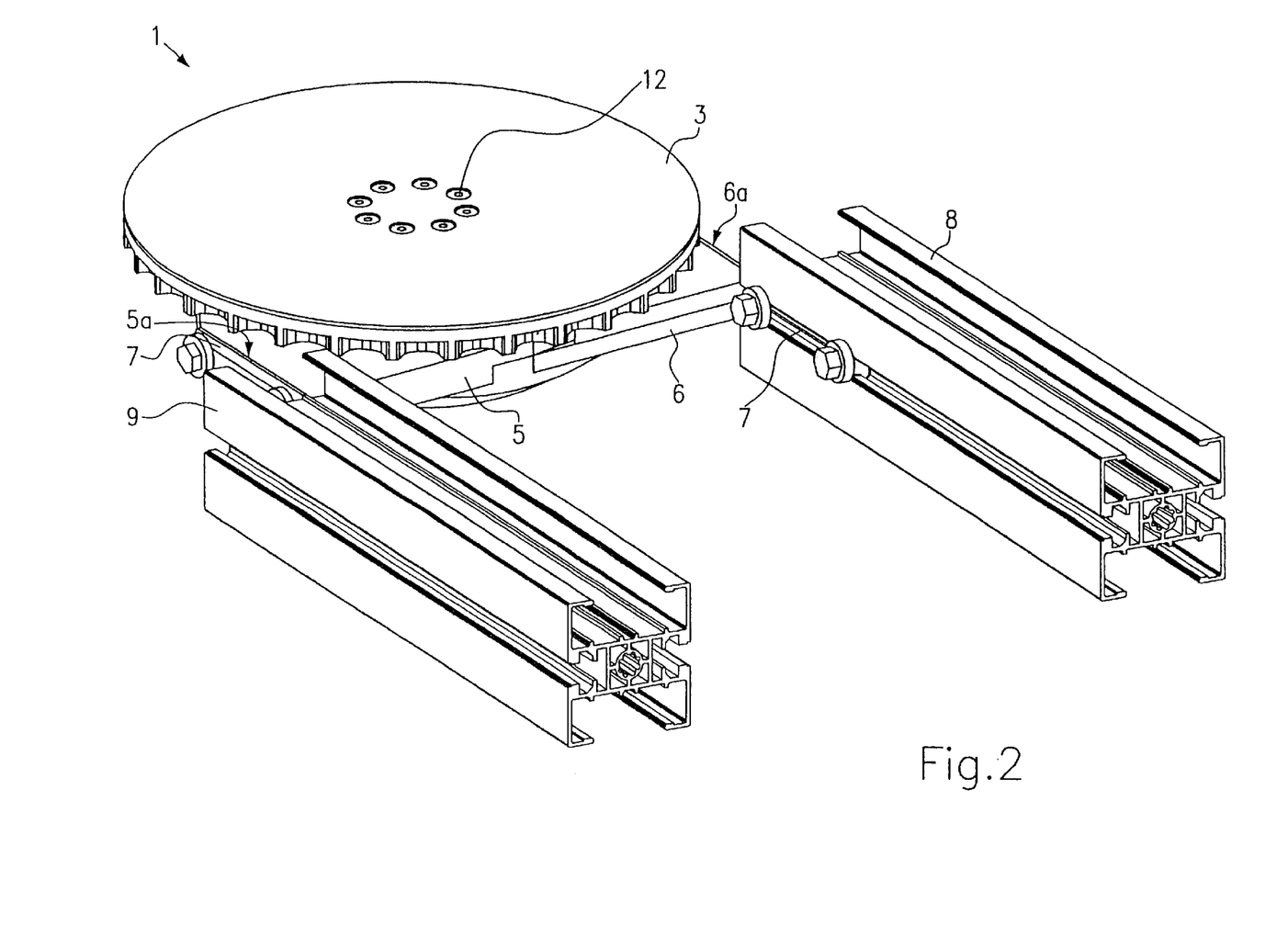
FIG. 2 is a perspective view from above of the deviating station shown in FIG. 1.
Figure 5:
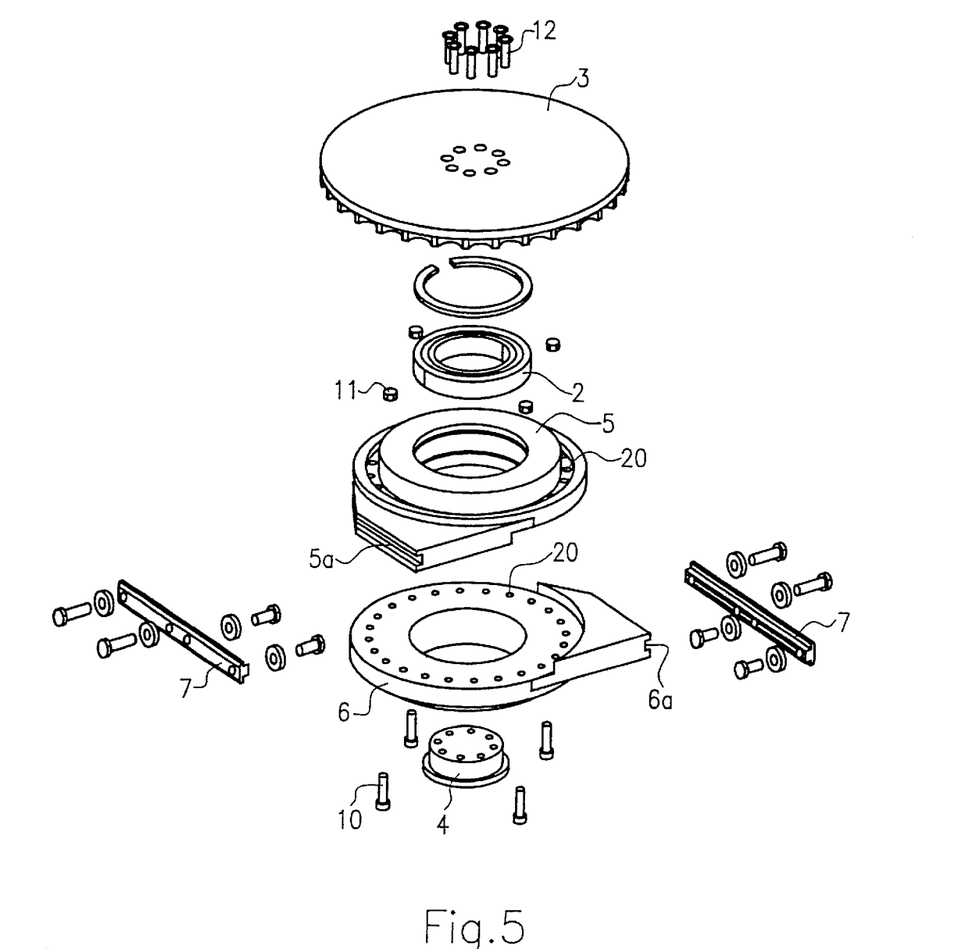
FIG. 5 is a schematic, perspective exploded view of the inventive deviating station.

As can be seen specifically from FIGS. 1, 2 and 5 the inventive deviating station 1 has a ring shaped deviating wheel which has a plurality of teeth on its outer periphery. As can be seen from FIG. 1, the deviating wheel 3 is mounted on a bearing 2 through a connecting element 4 and is rotatable about a central axis A. The connecting element 4 is connected with the deviating wheel 3 by screws 12. Furthermore, the deviating station 1 includes a stationary receptacle which is composed of two parts. In particular the receptacle has an upper component 5 and a lower component 6. The both components 5, 6 are releasably connected with one another by screws 10 and nuts 11.

Figure 3:
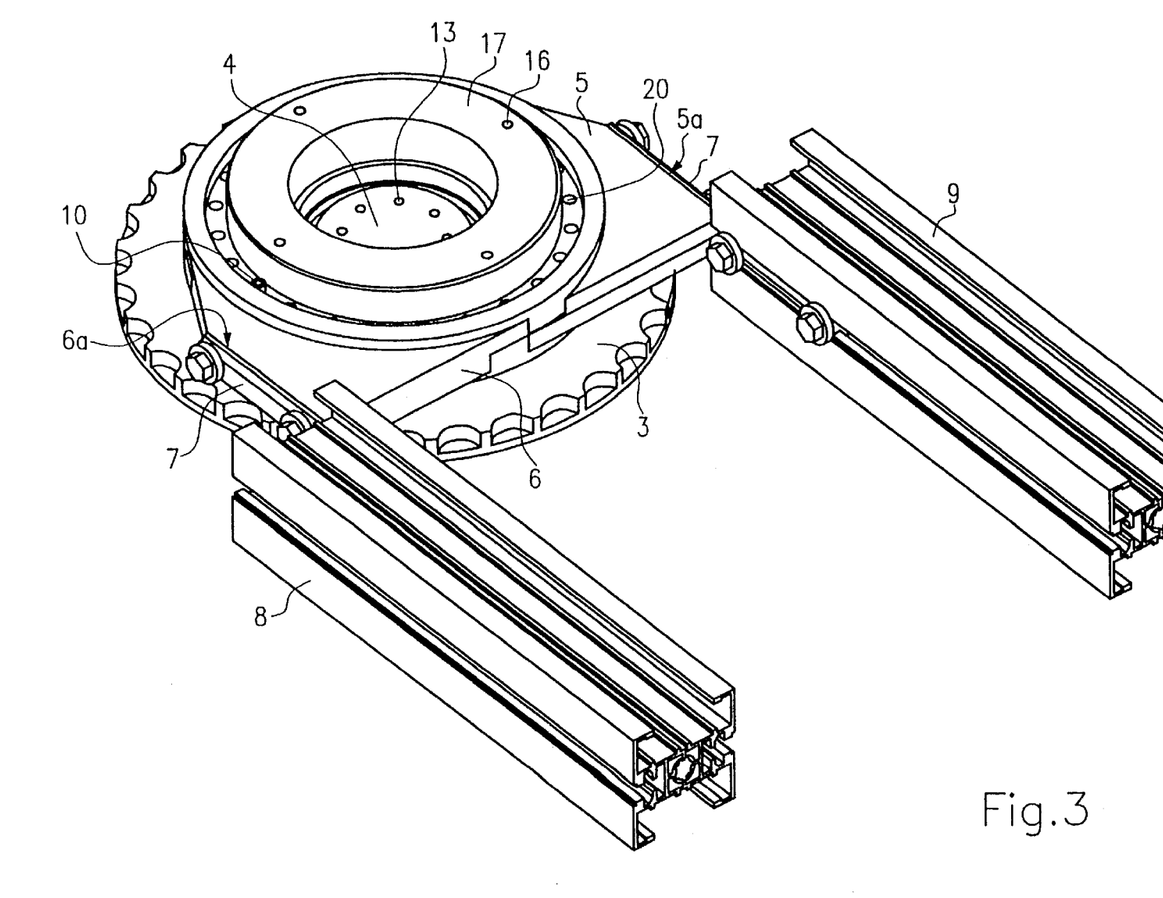
FIG. 3 is a perspective view from below of the deviating station of FIG. 1.
Figure 4:
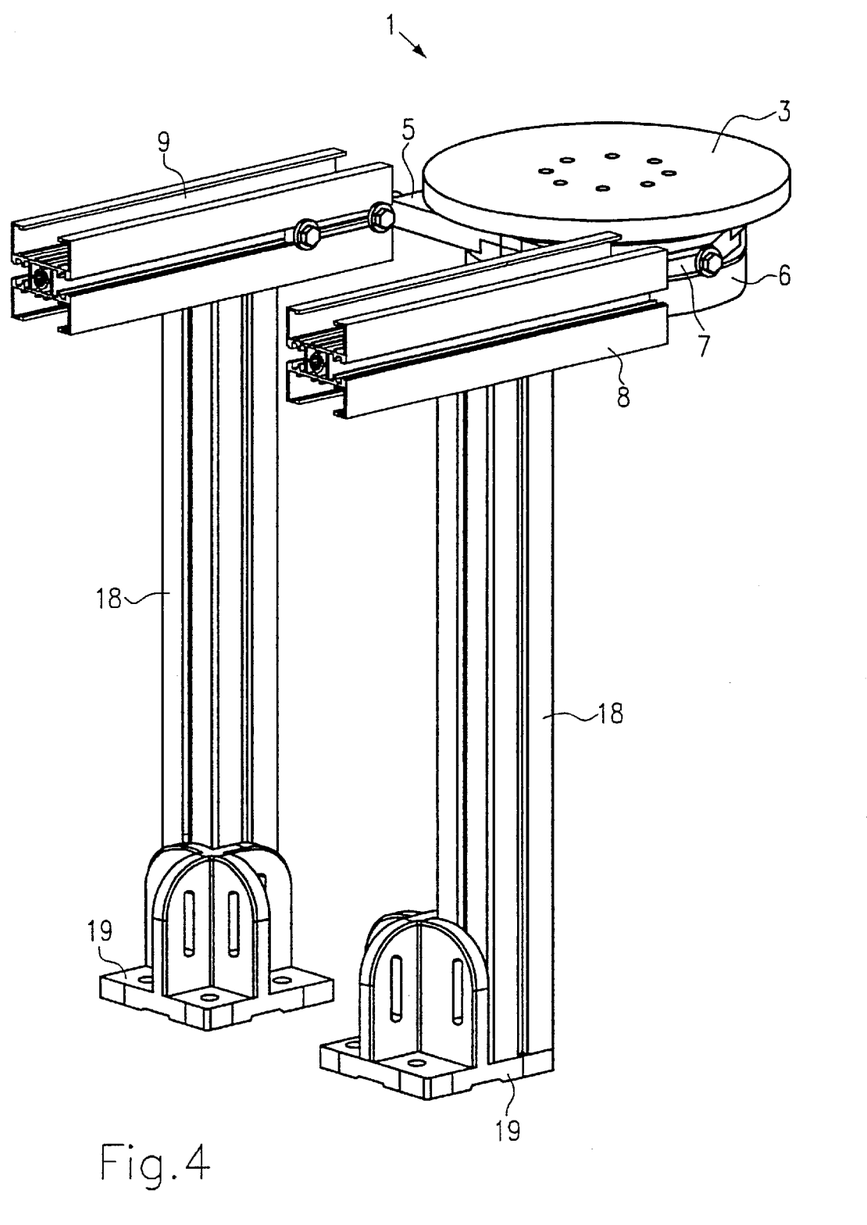
FIG. 4 is a perspective total view of the deviating station.

As can be further seen from FIG. 1, a ring-shaped flange 15 is arranged in the upper component 5. It is in contact with an inner peripheral opening of the lower component 6. As can be seen also from FIG. 1, the upper and lower components 5 and 6 are arranged asymmetrically and the upper component 5 has an outer side 5a, and the lower component 6 has an outer side 6a. As can be seen in particular from FIGS. 2 and 3, profiles 8 and 9 are connected to the outer sides 5a and 6a by a profile connector 7. In particular, the profile 9 is connected to the outer side 5a of the upper component which leads the not shown chain from the deviating station. The profile 8 is mounted on the outer side 6a of the lower component 6, which leads the chain to the deviating station 1. As shown in FIGS. 2 and 3 the deviating station are adjusted so that they deviate the chain over an angle of 180°.

As shown in particular on FIG. 3, an intermediate flange is mounted on the lower component 6. It can be mounted by mounting means in threads 14 of the lower component 6. Threads 16 shown in FIG. 3 are provided on the intermediate flange 17 for mounting a not shown gear motor. Furthermore, as shown in FIG. 1, openings 13 are provided on the connecting element 4 and serve for mounting of a not shown coupling for torque transmission.

As shown in FIG. 2, further supports 18 are provided. They are mounted on the profiles 8 and 9 and have each a foot 19 on their lower end.

The exploded view of FIG. 5 shows that the upper component 5 and the lower component 6 are formed identically. The components are mounted opposite to one another. Therefore the components 5 and 6 can be turnable relative to one another about the axis A.

The adjusting possibility of the inventive deviating station 1 is illustrated hereinbelow. When the screws 10 shown in FIG. 1 are released, the lower component 6 is turned relative to the upper component 5 about a ring-shaped flange 15. Since the profile 8 and 9 are each mounted on the outer sides 5a of the upper component or 6a of the lower component, the turning of the components 5 and 6 relative to one another leads to a change of the deviating unit at the deviating station.

When the components 5 and 6 are turned relative to one another their position is fixed by the screws 10 again. As can be seen particularly from FIGS. 3 and 5, a plurality of openings 20 are provided in the upper and the lower components 5 and 6. Depending on the position of the openings 20 relative to one another, different angles can be adjusted.

For providing a completely flexible adjustment of the deviating angle at the deviating station, elongated holes can be provided in the upper and the lower components 5 and 6 correspondingly. Corresponding screws can be introduced into the elongated holes and make possible a connection of the upper and the lower components 5, 6 of the receptacle in any positions. Thereby it is possible in accordance with the present invention to adjust the angle at the deviating station in any fashion. As a result, the disadvantages of the known deviating station disclosed in the prior art which have fixably predetermined angles can be eliminated. With the receptacle which is separated into the upper component 5 and the lower component 6 with the support of the deviating wheel 3 of the upper component, a flexible adjustment of an angle of the deviating station can be provided in a simple manner.

Thereby it is possible to guide a transporting chain which is movable on all side flexible in space and to adapt to different layouts of an endless conveyor. It should be mentioned that for example with a change the transporting path of the deviating station can be adapted in a simple manner to the changed transporting path, for example to another deviating angle. Thereby the inventive deviating stations can be used repeatedly in transporting systems with changing layouts.

The present invention deals with a deviating station 1 for a continuous conveyor, in particular a chain conveyor, and includes a deviating wheel 3 which is rotatably supported on a bearing 2 and a pulling means, in particular a chain, which is deviated in a predetermined angle. Further, a stationary receptacle is provided in which the bearing 2 is supported. The receptacle is composed of several parts and has an upper component 5 and a lower component 6. The both components 5, 6 are releasably connected with one another, and the components 5, 6 can turn relative to one another to adjust the deviating angle of the pulling means of the continuous conveyor in any fashion.

Figure 6:
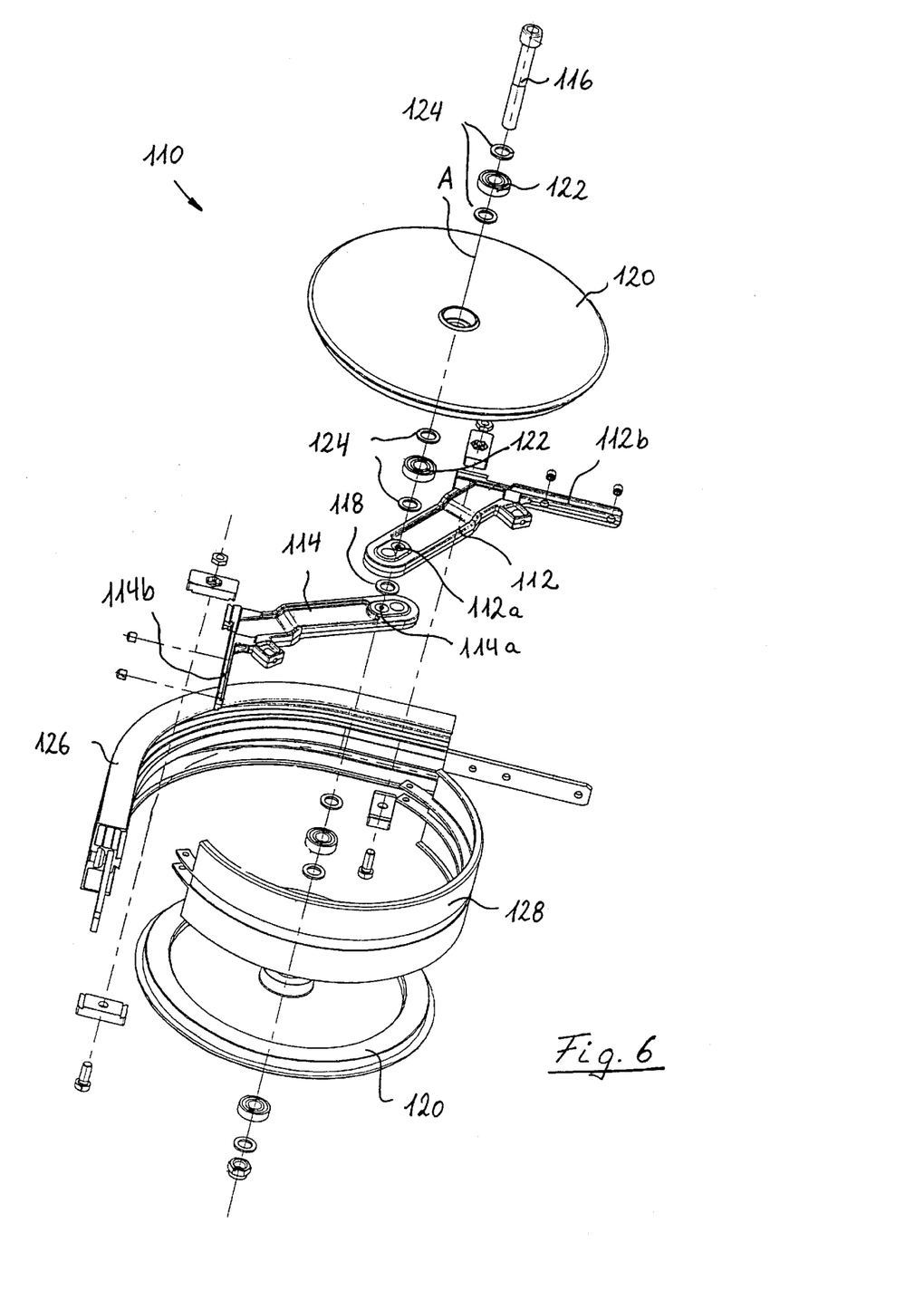
FIG. 6 is an exploded view of this deviating device.

FIG. 6 shows a second embodiment of the inventive deviating device. The deviating device 110 includes two identically formed components 112 and 114 produced for example as cast parts. They can connected with one another by a single screw pin 16 which extends substantially coaxial to the turning axis A. The components 112 and 114 are joined for this purpose in the region of their one free end by a screw pin 116 extending through throughgoing opening 112a and 115a. This makes possible the use of the cast parts for making the deviating devices with different deviation radii. Between the both components 112 and 114, a spacer or centering ring 118 is provided. In this way, the components 112 and 114 can be fixed by the screw pin 116 in any arbitrary angular position relative to the turning axis A.

By tightening the screw pin 116, two deviating wheels 120 are simultaneously mounted on the component 112 and 114, of which one is associated with an upper run and other is associated with the lower run of the transporting means. The deviating wheel 120 are rotatably supported on both components 112 and 114 by bearing elements 122.

At their radial outer ends with respect to the turning axis A, on the components 112 and 114 connecting elements 112b, 114b are formed. The serve for connection with a track portion of the transporting track.

The deviating device 110 is completed by two cover elements 126 and 128. The protect the inner space of the deviating device 110 which encloses both deviating wheels 120 from penetration of foreign substances.

Further design possibilities of the deviating device 10 and the corresponding advantages are disclosed in the description of the embodiment of FIGS. 1–5 and the embodiment of FIGS. 7–10.

FIGS. 7–10 show a deviating station in accordance with a third embodiment of the present invention.

Figure 7:
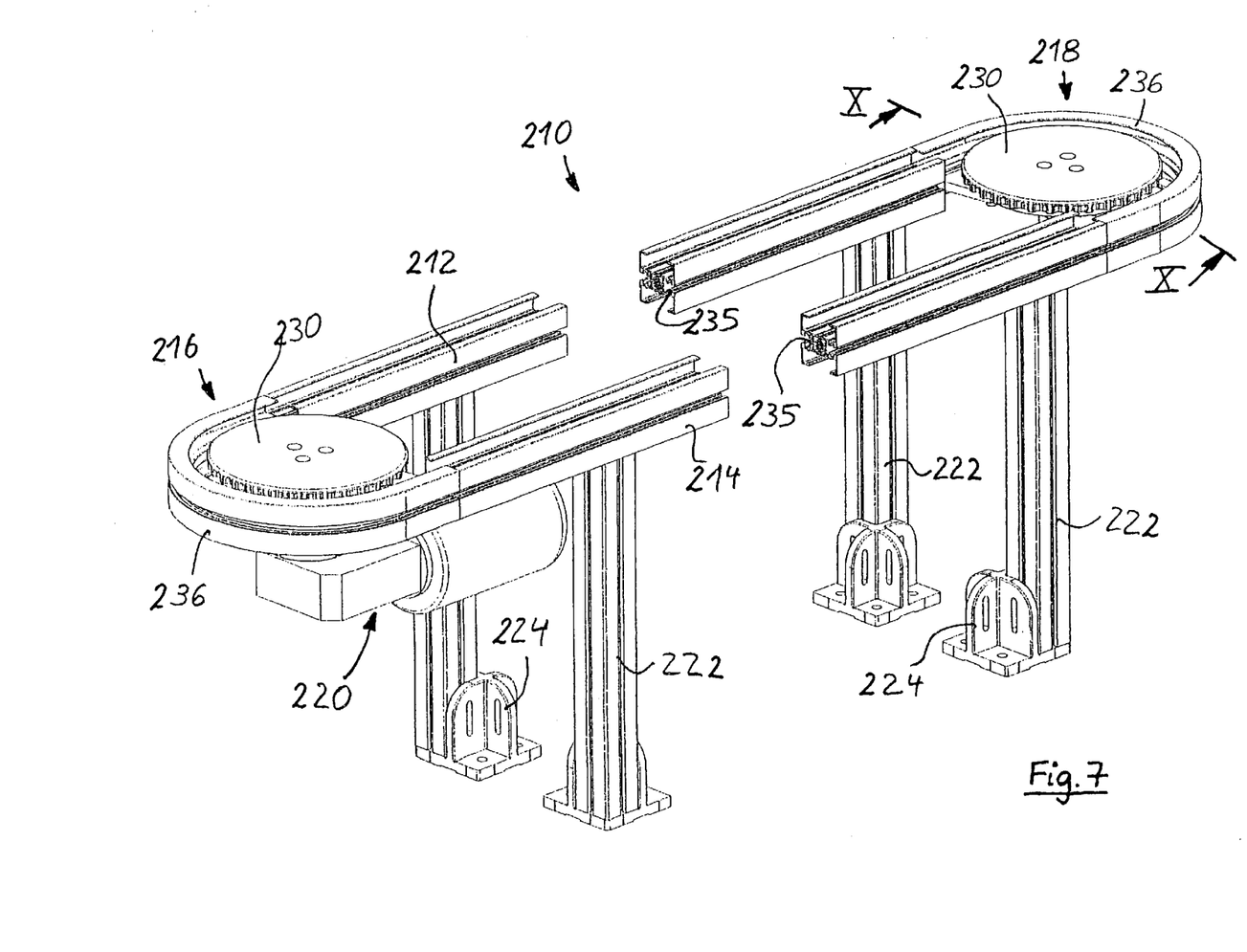
FIG. 7 is a perspective view of a transporting system from above.

A transporting system 210 is shown in FIG. 7. The transporting system 210 has a not shown, spacial transporting chain which forms the transporting means. The corresponding means in the embodiment of FIG. 1 deviate only in the plane of its transporting direction. Also, other transporting means, for example round belts or curved plate chains can be used as well.

The transporting system 210 includes two straight, equally long and parallel track portions 212, 214 which are shown in a broken view. The track portions 212, 214 tangentially adjoin the deviating units 216, 218, on which the track portions 212, 214 are mounted at their end. Thereby an endless rotating transporting system 210 is formed by the transporting means. The deviating units 206 includes a drive 220 which is flanged from above on the deviating unit 216. The transporting system 210 stands on four columns 222, with two columns mounted on a track portion 212, 214 and anchored on a ground through a pedestal 224.

It can be seen that the transporting system 210 can have a different basic contour or course or another "layout" than that in FIG. 7. It is possible to provide more deviating units 216, 218, to deviate the transporting means in more transporting planes, and to curve the track portions 212, 214, etc. The transporting system 210 can thereby be easily adapted to the corresponding requirements.

Figure 8:
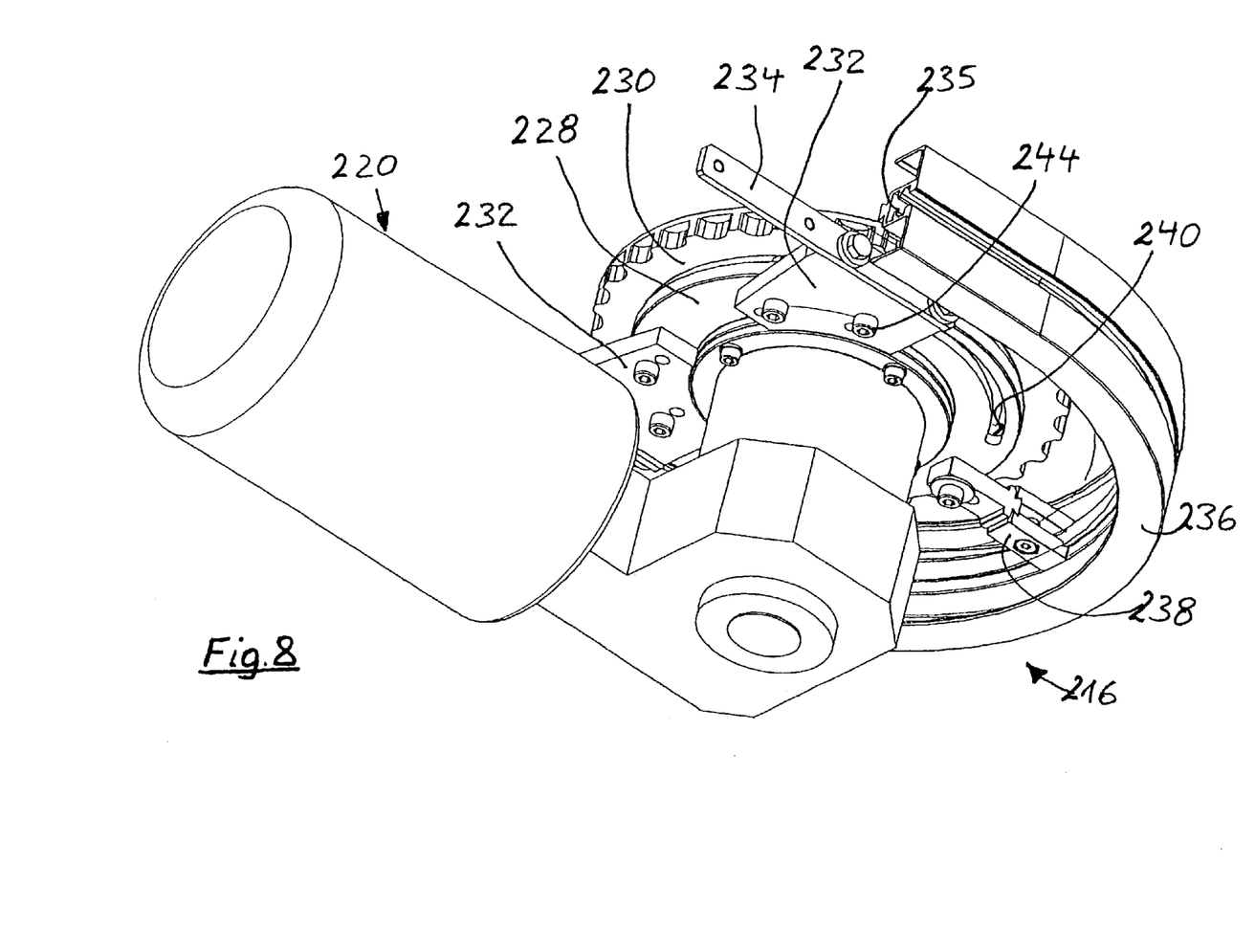
FIG. 8 is a perspective view of a deviating unit from below.

As can be seen from FIG. 8, the deviating units 216, 218 have a round plate 228. At the side of the plate 228, which is opposite to an oppositely provided drive 220, a deviating wheel 230 is supported. Instead of the rotatable deviating wheel 230, on which the transporting means rotate, also a device can be provided on which the transporting means can slide, for example a rail.

Two substantially triangular rings 232 or adaptor plates or clamping plates are arranged moreover on the plate 222, turnably and at a side which is opposite to the deviating wheel 230. Screwed, steel-shaped connectors 234 of the track portions 212, 214 are arranged on the outer side 233 of the wing 232 and fix the deviating unit 216, 218. The connectors 234 are anchored each in a longitudinal groove 235 (FIG. 7) of the track portion 212, 214. Furthermore, in the present embodiment on the wings 232 a curved member 236 is mounted, which represents the outer guide for the transporting means of the deviating unit 216, 218. The curved member 236 is finally clamped with the plate 228 via a multi-part clamping connector 238.

Figure 9:
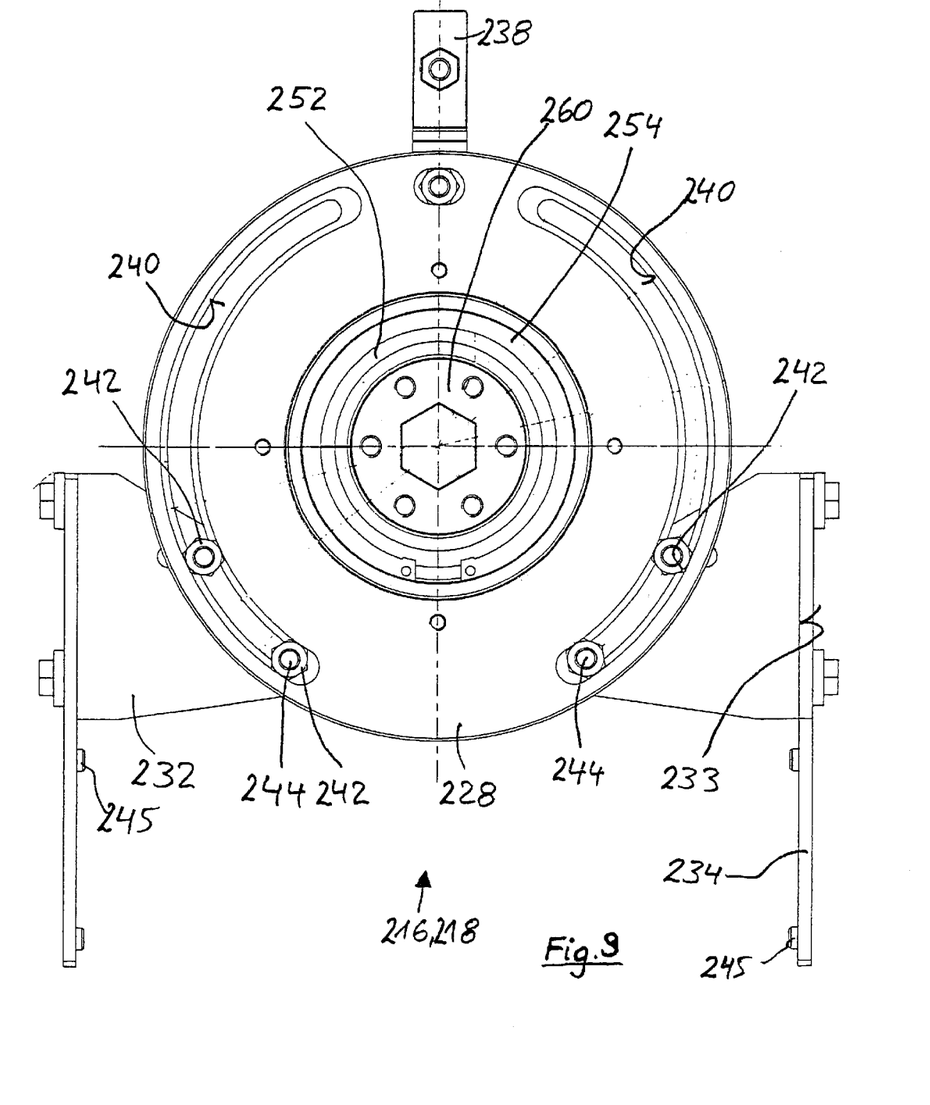
FIG. 9 is a plan view of the deviating unit of FIG. 8.

It can be seen from the plan view of FIG. 9 (without the deviating wheel 230) that the deviating unit 216, 218 is formed substantially mirror-symmetrical. The both wings 232 are guided in two diametrically opposite elongated holes 240 of the plate 228, which has the shape of two circular arc segments and each have an angle of approximately 130°. The elongated holes 240 are formed stepped so that two nuts 242 for two mounting screws 244 for the wing 232 extend in the elongated holes 240 and are guided in a non rotatable fashion. Instead of the wing 232 with the mounting screws 244, also other pin-shaped elements can be arranged on the plate 228. For example, two pins can be provided with a narrow gap for guidance and a screw and a nut for clamping. Alternatively, instead of the elongated holes also throughgoing openings can be provided on a circular arc.

Because of the above described construction of the plate 222, the angle over which the transporting means must deviate on the deviating units 216 or 218 can be adjusted steplessly or in steps. For mounting the wings 232 are turned via the screws 242 and nuts 244 in the elongated holes 240 until they reach their position. The connectors 234 are mounted on the wings 232, for example screwed. Then, the wings 232 with the connectors 234 are displaced in the undercut elongated grooves 235 or mounting grooves of the track portions 212, 214 and clamped via the threaded pins 245 shown in FIG. 9 which press against the groove base of the elongated grooves 235. Subsequently, the nuts 24 of the screws 242 can be completely tightened. At the end, or alternatively, at the beginning, a curved member 236 which is adapted to the angle of the track portions 212, 214 is mounted through the connector 238 on the plate 228 or the deviating units 216, 218. In addition a connector 234 is mounted in the outwardly located longitudinal grooves of the track portions 212, 214 which are in alignment with one another and the curved member 236.

Figure 10:
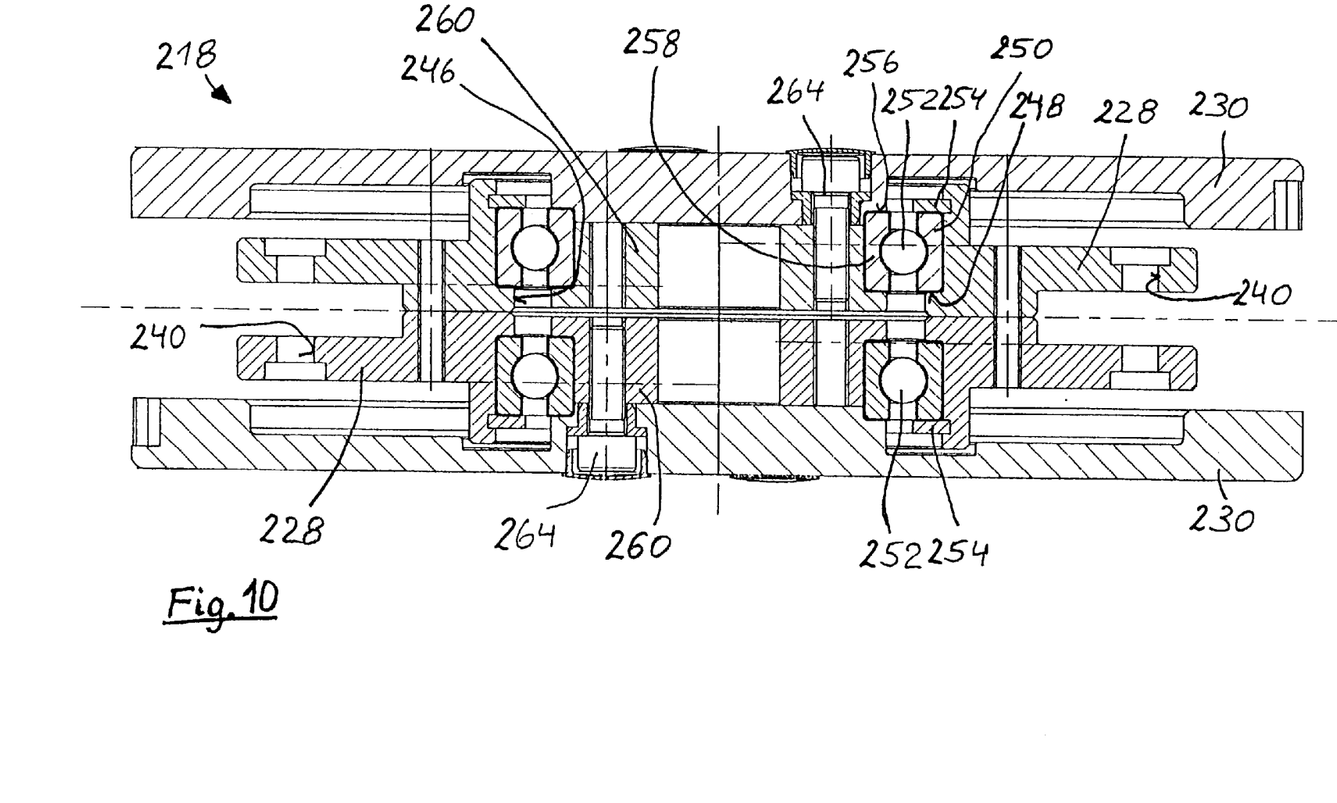
FIG. 10 is a section through the deviating unit in a section plane X—X in FIG. 7.

FIG. 10 shows a deviating unit 216, 218 which has two deviating wheels 230. They deviate the transporting means in an upper run in the transporting plane and a lower run parallel to the transporting plate. For this purpose the two plates 228 are screwed with one another.

For supporting a deviating wheel 230, the plate 228 has a central opening 246. The outer ring 250 of a ball bearing 252 is supported on a projection 248 of the recess 246 and is held in its position by a safety ring 254. The deviating wheel 230 is inserted with its stepped or projecting collar 256 into the inner ring 258 of the ball bearing 252. A rotary member 260 abuts with its projection 262 against the other end of the inner ring 258 and is screwed with the deviating wheel 230 by a screw 264. The rotary member 260 has a central opening 266, via which the drive 220 can be coupled. In this case only one of the both shown plates 228 with the deviating wheel 230 supported on it can be provided.

With the support of the deviating wheels 230 in the both plates 228 which are screwed with one another, the deviating wheels 230 can rotate opposite to one another. This is required for a deviating unit 216, 218 shown in FIG. 10.

Instead of the shown both wings 232, also one wing 232 can be arranged turnably. Another ring 232 can be formed in this case of one piece with the plate 228. The mirror-symmetrical construction of the plate shown in FIGS. 7–10 in connection with the both wings 232 is however preferable.

It will be understood that each of the elements described above, or two or more together, may also find a useful application in other types of constructions differing from the types described above.

While the invention has been illustrated and described as embodied in deviating device for transporting means, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A deviating device for deviating a transporting means in a deviating plane, comprising a deviating unit; two track portions of a movement path of a transporting means adjoining the deviating device and defining a deviating plane, and also mountable on said deviating unit, each of said track portions being mountable on a separate component of the deviating device, said both components being turnable relative to one another about a turning axis which is substantially orthogonal to the deviating plane and being fixable in a predetermined angular position; and a base plate, wherein said both components are mountable on said base plate in a predetermined angular position.

2. A deviating device as defined in claim 1, wherein said base plate has two elongated holes.

3. A deviating device as defined in claim 2, wherein said elongated holes are located diametrically opposite relative to said turning axis.

4. A deviating device as defined in claim 1, wherein said components are connectable in a predetermined angular position; and further comprising connecting means including at least one connecting pin.

5. A deviating device as defined in claim 4, wherein said connecting pin is formed as a screw pin.

6. A deviating device as defined in claim 1, wherein said components are identical with one another.

7. A deviating device as defined in claim 1; and further comprising a connecting element which is formed of one piece integrally with each of said components and is mounted on one of said track portions.

8. A deviating device as defined in claim 1, wherein said track portions have a receiving groove; and further comprising a connecting element arranged in said receiving groove of said track portion and connected to said track portion component in said receiving groove.

9. A deviating device as defined in claim 1; and further comprising a deviating wheel for said transporting means, said deviating wheel being supported rotatably about said turning axis through a bearing on a receptacle which comprises one of said components.

10. A deviating device as defined in claim 9; and further comprising a driving unit for displacing said deviating wheel in a rotary movement around said turning axis.

11. A deviating device as defined in claim 10; and further comprising a coupling arranged between said driving unit and said deviating wheel.

12. A deviating unit as defined in claim 9, wherein said deviating wheel is plate-shaped and is connected with said bearing through a connecting element.

13. A deviating device as defined in claim 1, wherein said deviating wheel is provided with a flange which is formed of one piece and is connected with said bearing.

* * * * *